E. J. WEAVER.
AUTOMOBILE SAFETY BRACE.
APPLICATION FILED MAR. 15, 1915.
1,149,006.
Patented Aug. 3, 1915.
2 SHEETS—SHEET 1.
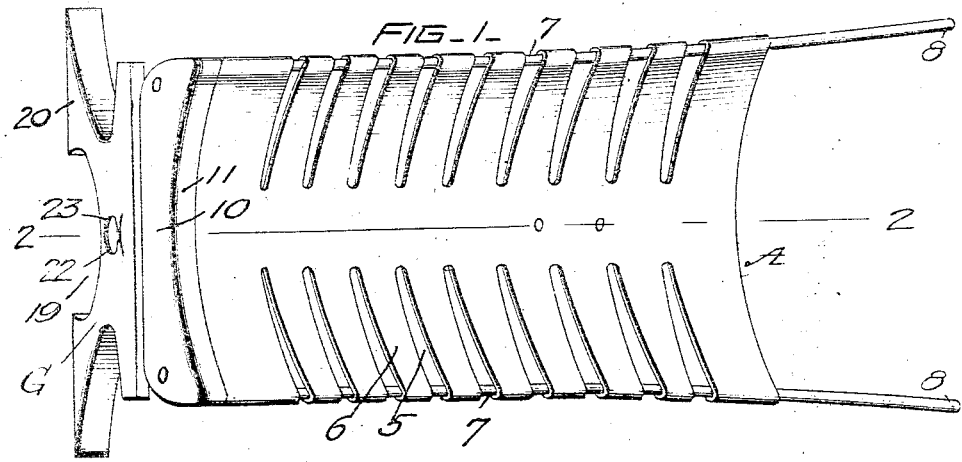
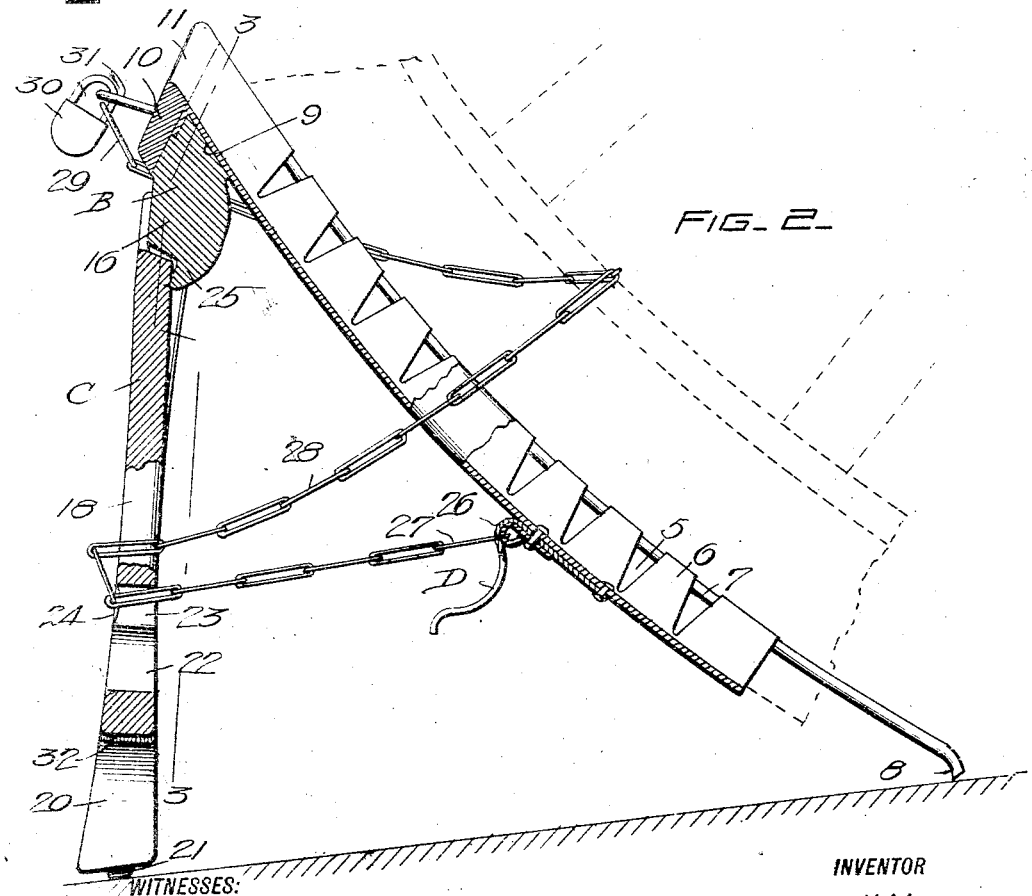
INVENTOR
EDGAR J. WEAVER,
BY Munn & Co
ATTORNEYS E. J. WEAVER.
AUTOMOBILE SAFETY BRACE.
APPLICATION FILED MAR. 15, 1915.
1,149,006.
Patented Aug. 3, 1915.
2 SHEETS—SHEET 2.
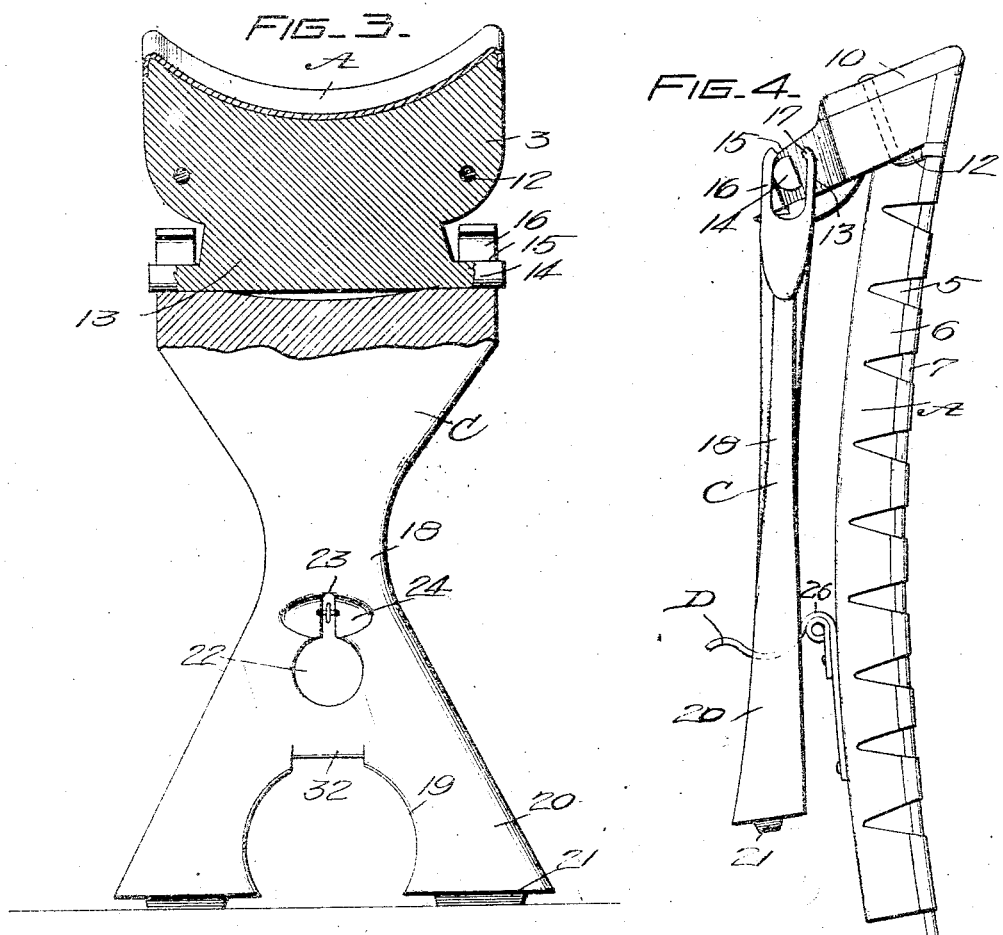
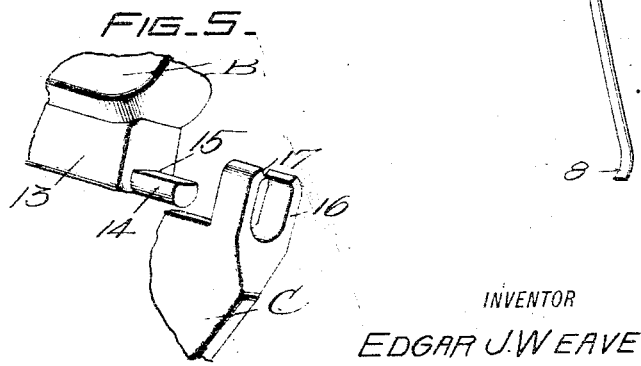
WITNESSES:
INVENTOR
EDGAR J. WEAVER,
BY Munn & Co.
ATTORNEYS

UNITED STATES PATENT OFFICE.

EDGAR JACOB WEAVER, OF WESTERVILLE, OHIO.

AUTOMOBILE SAFETY-BRACE.

1,149,006.  Specification of Letters Patent.  Patented Aug. 3, 1915.

Application filed March 15, 1915. Serial No. 14,592.

*To all whom it may concern:*

Be it known that I, EDGAR J. WEAVER, a citizen of the United States, and a resident of Westerville, in the county of Franklin and State of Ohio, have invented a certain new and useful Improvement in Automobile Safety-Braces, of which the following is a specification.

This invention relates to an improvement in automobile safety braces, and one of the principal objects of the invention is to provide a brace against which one of the wheels of an automobile may be rolled and secured, in order that the automobile may be prevented from accidentally rolling down hill or moving from a stationary position, the brace being adapted to be locked upon the wheel, so that the automobile cannot be stolen.

A further object of the invention is to provide a safety brace in the form of a resilient pan or apron carried by a suitable support and against which one of the tires of the automobile may be rolled in order that the safety brace may be secured to the wheel, said pan or apron being so adapted when so connected to the tire, to conform to the configuration of the latter, so as to steadily brace and prevent the same from moving.

Still a further object of the invention is to provide a device of the class described which will be extremely simple, durable, efficient in operation, and cheap to manufacture.

With these and other objects in view, which will become apparent as the description proceeds, the invention resides in the construction, combination, and arrangement of parts hereinafter described and claimed, and illustrated in the accompanying drawings in which like characters of reference indicate like parts throughout the several figures, of which—

Figure 1 represents a plan view of a safety brace constructed according to my invention, the same being shown in operative position. Fig. 2 represents a view in section taken through the same, on the plane indicated by the line 2—2 of Fig. 1; Fig. 3 represents a view partly in section taken transversely of the device, on the plane indicated by the line 3—3 of Fig. 2; Fig. 4 represents a view in side elevation of the device in folded position. Fig. 5 represents a fragmentary view in perspective of the hinge connection between the base lock and the support.

In carrying out my invention, I provide a pan or apron A for receiving the tire of the automobile wheel to which the device is to be attached. This pan is constructed of a strip of material which is preferably of a somewhat resilient nature, the strip being longitudinally and transversely curved so as to acquire the general configuration of the outer side of a tire. The strip is provided along both longitudinal edges with inwardly extending slits or recesses 5 extending from the edges toward the center of the strip, the ends of the tongues 6 formed by the slits or recesses being bent over the side bars 7 of the device. As shown, the longitudinal edges of the pan or apron throughout the length of the latter, are turned upon the bars 7, whereby such bars are secured to the pan. The bars near the lower end of the device diverge and at their lower ends, the bars are downwardly turned and sharpened as at 8. The points 8 are adapted to bite into the ground when the device is in operation, to prevent slipping of the same, and these points are wider apart than the width of an ordinary automobile wheel tire, so that when the wheel is backed into the apron or pan, it will be sure to pass between the lower ends of the side bars or rods 7, and thus be properly seated and engaged upon said pan. The bars are made of suitable material, preferably being formed of some steel wire, and similarly to the pan they are longitudinally curved to assume generally the circumferential curvature of an automobile tire.

The rear transverse edge of pan or apron A is crimped down upon the rear rabbeted face of the base block B. This block may be made in the form of a casting, and against its upper inclined face 9 the rear under face of the apron rests, as shown in Fig. 2. A plate 10 having an upper concave edge 11 is then riveted upon the rear face of the base block so as to secure the pan in place thereon. The curvature of the upper edge of plate 10 is substantially coincident with the transverse curvature of the pan or apron. As indicated in Fig. 4, the upper ends of bars or rods 7 are bent downwardly as at 12 adjacent the base blocks, and then extend rearwardly through openings in the block and extend through the plate 10, and have their ends mashed or flattened down upon said plate whereby to help maintain the latter in position, and at the same time secure the rods in braced position upon the base block.

Extending in opposite directions from the reduced lower end 13 of block B, are the pivot pins 14. These are flattened as at 15 on their sides nearest the upper edge of the base block. The pins are adapted to be engaged by the eyes 16 formed at the upper end of the support C. These eyes are substantially oval shaped and at their upper ends are open as at 17 whereby they may be engaged upon the pins 14, the openings 17 in the eyes however being of a width just equal to the width of the pins through the thinnest portion of the latter.

The support C is tapered at its central portion as at 18, and at its lower end is provided with a cutaway portion 19 defining the legs 20 on the lower ends of which the sharpened cleats or lugs 21 are provided, these lugs being adapted to prevent slipping of the device when in place. Above the recess or opening 19, the support C is provided with an opening 22 from which a recess 23 extends in a vertical direction. On either side of the recess the rear face of the support is dished or concaved as at 24.

The base block B is provided on its front face with a depending flange 25 which, when the device is in operative position as indicated in Fig. 2, is adapted to engage against the front face of the support at the upper end thereof in order to prevent movement of the support and pan or apron toward each other, thus preventing the collapse of the device when pressure is placed upon the same. The eyes 16 are provided with oblong openings through which the pins 14 may extend, in order that the support C may be shifted downwardly relatively to the base block B in folding or in opening the device, as will be readily understood.

Secured to the rear face of the pan or apron A at the lower end of the latter, is a spring latch D. The latter is coiled upon itself as at 26 near the point at which it is attached to the pan, in order to form a loop through which a ring 27 extends. This ring forms an inner terminal of a chain 28 which is adapted to extend through the opening 22 in the support C. The chain is utilized in lashing the device to the automobile wheel in the manner indicated in Fig. 2, and after having been passed through opening 22 one of the links is slipped upwardly in the recess 23 to prevent outward relative movement of the apron and support respectively. The chain is then looped about the wheel in the manner indicated, and a ring 29 carried at the opposite end of the chain may then be connected by means of a padlock 30 with an eye or staple 31 secured in the base B.

In folding the device in the manner indicated in Fig. 4, the chain is first disengaged and the device removed from its place beneath the wheel, the support C is then shifted downwardly relatively to the base B in order to allow the support to move beyond the flange 25, and said support is then shifted toward the pan or apron A. In doing this, the spring clip or latch D engages over a rounded portion 32 between the legs 20, defined by a recess forming an extension of the opening 19, thus maintaining the device in closed position.

The chain together with the padlock and staple or eye have not been shown in Figs. 1 and 4, for the purposes of clear illustration.

Such a device as I have provided will be found of general use in blocking or chocking the wheels of automobiles, in order to prevent accidental movement of the machine from stationary position, and at the same time will be found to prevent stealing of the automobile, by reason of the means for locking and lashing the device to the wheel.

The material from which the device may be made is optional, although it will be necessary to make the base block B and the support C extremely strong, for obvious reasons. The apron will preferably be formed of some resilient material, so that when the wheel is backed or placed upon the apron, the latter will give in order to assume the general contour of the tire of the wheel.

Although I have described the preferred embodiment of my invention, I may desire to make such changes in the construction, combination, and arrangement of parts thereof, as do not depart from the spirit of the invention, and the scope of the appended claims.

I claim:—

1. A device of the class described, comprising a base block, a pair of resilient rods secured thereto and extending therefrom, said rods diverging toward their outer ends, a resilient strip of metal disposed between the rods and having its longitudinal edges turned upon said rods, said strip of metal being longitudinally and transversely concaved, the inner edge of said strip of metal being crimped into the rear rabbeted edge of the base block, a plate disposed upon said base block and overlying the crimped edge of the strip, a pair of pins extending in opposite directions from said base block, said pins being provided with flattened sides, a support provided with upwardly extending eyes having oblong openings therein, said eyes at one end being open, legs carried by the support, said support being provided with an opening therein having a recess extending therefrom, a spring latch carried by the said strip, a flexible element connected at one end to said spring latch and adapted to be extended through the opening in the support, and adapted to be engaged within the recess and passed around the tire of a wheel, an eye carried by the base block, and means for locking the free end of the flexible element to said eye.

2. A device of the class described comprising a base block, a pan secured thereto, said pan being longitudinally and transversely concaved, and being formed of a resilient material, outwardly diverging rods carried by the base block, over which the edges of the pan are turned, said rods at their outer ends being provided with engaging points, a support pivotally connected to the base, said support having a sliding pivotal connection with said base, a flange carried by the base and adapted to engage the support for maintaining the support in spaced relation with the pan, a spring latch carried by the pan, and a flexible element connected to the spring latch and adapted to be passed through an opening in the support and lashed about a wheel, and adapted to be connected with the base for maintaining the device upon the wheel, said pan adapted to give whereby to assume the contour of the tire of the wheel.

3. A device of the class described including a base, a longitudinally and transversely concaved apron carried by said base, means for supporting said apron, said apron being provided with a plurality of resilient tongues connected to the supporting means, a support pivotally connected with the base, means for maintaining the support in spaced relation with the apron when the device is in operation, and means for maintaining the support in close relation with the base when the device is in inoperative position.

4. A device of the class described including a base, a longitudinally and transversely concaved resilient apron carried thereby, a supporting means for the apron, a support connected with the base and adapted to be moved into operative and inoperative positions, means for maintaining the support in operative position, and means for maintaining the same in inoperative position at will.

5. In a device of the class described, a base, a pan connected therewith, oppositely extending pins carried by the base, said pins being provided with flattened surfaces, a support, upwardly extending eyes carried by said support, said eyes being provided with oblong openings through which the pins are adapted to be extended, said eyes at one end being open.

6. A device of the class described including a base, a pan carried thereby, a support connected to the base, a flexible element connected with the pan and adapted to be engaged with the support for maintaining the latter in fixed relation with the pan when the device is in operation, and means for locking the flexible element with the base at will.

7. A device of the class described including a base, a pan carried thereby, a support centrally connected with the base and being adapted to be moved into operative and inoperative positions, means for maintaining the support in spaced relation with the pan when in operative position, means for maintaining the support in close relation with the pan when in inoperative position, and means for locking the device to the tire of a wheel.

8. A device of the class described including a base, a support pivotally connected therewith, and a longitudinally and transversely concave resilient pan connected to the base, said pan adapted to give whereby to assume the contour of the tire of a wheel when said wheel is backed upon the pan.

9. A device of the class described including a base, a resilient pan carried thereby, a support pivotally connected with the base, means for maintaining the support in operative and in inoperative positions with relation to the pan, and means for supporting the longitudinal edges of the pan whereby the latter may assume the contour of the tire of a wheel when said wheel is backed upon the pan.

10. A device of the class described including a pan composed of resilient material and adapted to assume the contour of the tire of a wheel when said wheel is backed upon the same, and means for supporting the pan at will.

EDGAR JACOB WEAVER.

Witnesses:
B. B. WILSON.
A. A. RICH.